June 7, 1932.   R. L. NEWTON   1,862,195
AUTOMATIC PUMPING MECHANISM
Filed March 12, 1930
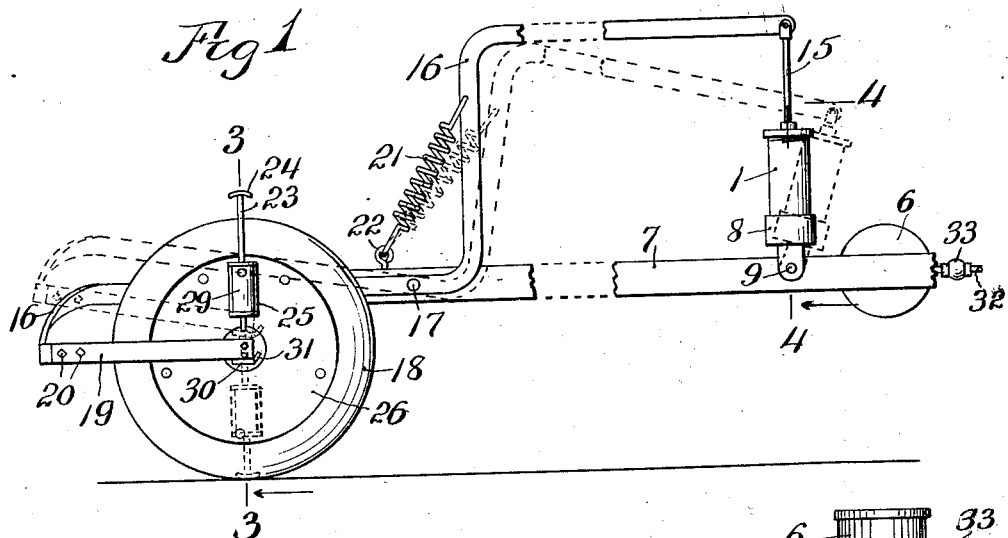
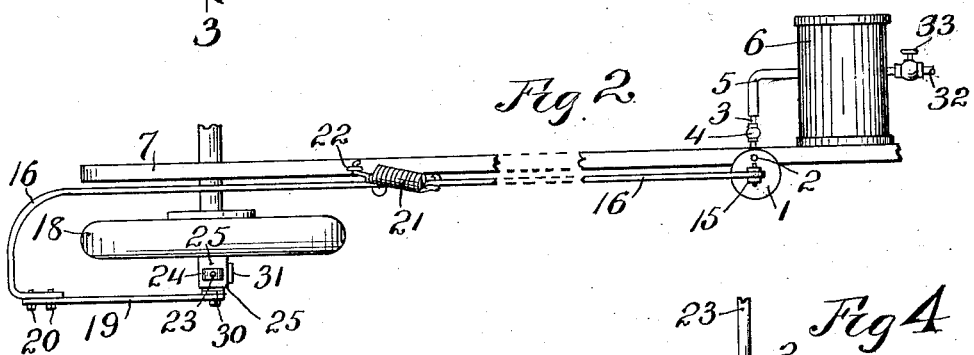
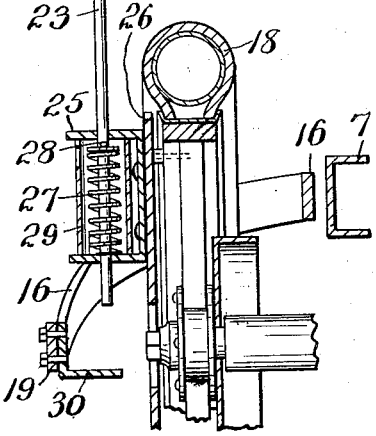
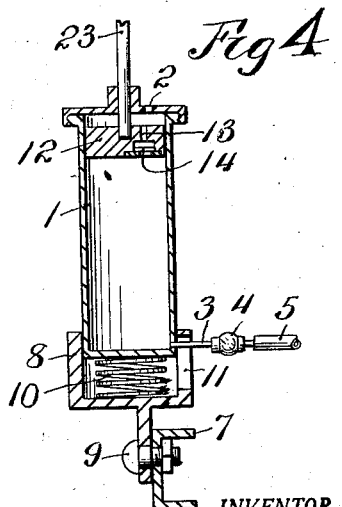
Witness
H. Vernon Olson
INVENTOR.
Ralph L. Newton
BY Warren D. House.
His ATTORNEY.

Patented June 7, 1932

1,862,195

UNITED STATES PATENT OFFICE

RALPH L. NEWTON, OF KANSAS CITY, MISSOURI

AUTOMATIC PUMPING MECHANISM

Application filed March 12, 1930. Serial No. 435,092.

My invention relates to improvements in automatic pumping mechanisms.

One of the objects of my invention is to provide a novel pumping mechanism by which air may be compressed and stored or used, as desired, and which mechanism is adapted for application to vehicles without alteration thereto, as upon an automobile, or upon a railway car, which is simple, cheap, strong, durable, not likely to get out of order, which is easily and quickly applied to the vehicle, and which is efficient in its operation.

The novel features of my invention are hereinafter fully described and claimed.

In the accompanying drawing, which illustrates the preferred embodiment of my invention, Fig. 1 is a side elevation, partly broken away, of my improved pumping mechanism shown applied to the frame and wheel of an automobile.

Fig. 2 is a top view of what is shown in Fig. 1.

Fig. 3 is an enlarged section on the line 3—3 of Fig. 1.

Fig. 4 is an enlarged section on the line 4—4 of Fig. 1.

Similar reference characters designate similar parts in the different views.

1 designates the cylinder of an air pump having in its upper closed end an intake 2, and which has connected to its lower portion an air conductor 3, which includes an outwardly opening check valve 4 and a flexible hose 5 connected to a storage tank 6 supported by the frame 7 of the car.

The cylinder 1 is slidably mounted in the upper end of a tubular supporting guide 8 which is pivoted on the frame 7 by a transverse bolt 9. In the guide 8 is provided yielding means comprising a vertical coil spring 10 upon the upper end of which rests the lower end of the cylinder 1. The guide 8 has a vertical slot 11 through which extends the conductor pipe 3.

A piston head 12 is reciprocative in the cylinder 1 and is provided therethrough with an air passage 13 in which is located a downwardly closing valve 14, Fig. 4.

15 designates the piston rod of the air pump, the upper end of said rod being pivoted to one end of a lever 16 fulcrumed at 17 on the frame 7. When the lever is oscillated on its horizontal axis 17 the piston rod 15 and piston head 12 will be reciprocated, thereby pumping air into the tank 6 through the conductor 3, past the check valve 4.

18 designates one of the rear frame supporting wheels of the car. The rear portion of the lever 16 is U shaped and the arms of said lever are disposed respectively at opposite sides of the wheel 18, the outer arm being provided with a removable portion 19, which extends forwardly to a point opposite the hub of the wheel 18. Two removable bolts 20 fasten the portion 19 to the outer arm of the lever.

When the rear end of the lever 16 is raised, the piston rod 15 will be forced downwardly, a coil spring 21 fastened at one end to the lever 16 and the other end to a bolt 22 mounted in the frame 7 retracts the lever 16 and the piston rod 15.

For forcing the rear end of the lever 16 upwardly, means actuated by the wheel 18 and the weight of the car are provided. Such means, as shown, comprises an actuating member consisting of a radially slidable rod 23 provided at its outer end with a shoe 24 adapted to strike and bear against the ground and to be forced inwardly thereby at each revolution of the wheel 18 as it travels along the ground.

The actuating rod 23 is radially slidable in holes provided in the two outwardly extending arms of a U shaped supporting member 25, Fig. 3, which is fastened to a circular plate 26 bolted to the felly of or otherwise fastened to the wheel 18.

A coil spring 27 encircling the rod 23, between the arms of the U shaped supporting member 25, bears at its inner end against the inner one of said arms, the other end of said spring 27 bearing against a transverse pin 28 mounted in the rod 23. The tension of said spring 27 normally forces the rod 23 radially outwardly to a position such, that, as the wheel 18 travels along the ground, the shoe 24 will strike the ground and will be forced thereby, with the rod 23 inwardly to the position shown in dotted lines in Fig. 1.

The coil spring 27 is enclosed by a tube 29 mounted between the arms of the U shaped member 25, and is thus protected from mud and dirt.

Fastened to the inner side of the portion 19 of the lever 16 is an angle plate 30, the horizontal arm of which has at its forward edge a lip 31 so located that, as the wheel 18 revolves, and the rod 23 is forced inwardly by the shoe 24 striking the ground, as has been described, the inner end of the rod 23 will strike the lip 31, and will, as the wheel 18 revolves, swing upwardly the rear end of the lever 16.

After the wheel 18 has revolved to a position in which the rod 23 will pass off from engagement with the angle plate 30, the rod 23 will be again forced to the outermost position, shown in Fig. 3, and in solid lines in Fig. 1, by the spring 27.

Thus during each revolution of the wheel 18, the actuating member 23 will swing the rear end of the lever upwardly, and the spring 21 will retract said lever, thereby effecting a complete operation of the pump.

In case that the shoe 24 should strike a rigid obstruction that will force the rod inwardly past its usual inward limit of movement, the spring 10 will yield, thus permitting the cylinder 1 to move downwardly. The tension of the spring 10 is such as to resist the usual pumping pressure applied to the air in the cylinder 1 by the piston head 12.

The air collected and held under pressure in the tank 6, for any purpose desired, may be withdrawn from the tank through a discharge pipe 32 having a shut off valve 33, Fig. 2.

I do not limit my invention to the structure shown and described, as many modifications, within the scope of the appended claims, may be made without departing from the spirit of my invention.

What I claim is:—

1. In an automatic pumping mechanism, the combination with a vehicle having a supporting wheel, of a pump carried by said vehicle apart from and not revoluble with said wheel, an actuating member carried by said wheel and arranged, when said wheel travels along the ground to strike the ground and to be moved thereby in one direction, yielding means for retracting said member, a lever fulcrumed on said vehicle and connected to and arranged, when oscillated, to operate said pump and movable by said member in one direction, and means for retracting said lever.

2. In an automatic pumping mechanism, the combination with a vehicle frame and a wheel supporting said frame, of a pump carried by said frame, an actuating member carried by said wheel arranged, when said wheel travels along the ground, to contact with the ground and to be moved in one direction thereby, and means actuated by said member for operating said pump.

3. In an automatic pumping mechanism, the combination with a vehicle frame and a supporting wheel therefor, of a pump carried by said frame, a lever fulcrumed on said frame and connected to and arranged, when oscillated to operate said pump, an actuating member carried by said wheel arranged, when said wheel travels along the ground, to contact with the ground and to be moved in one direction thereby and to engage and swing said lever in one direction, and means for retracting said lever.

4. In an automatic pumping mechanism, the combination with a vehicle frame and a supporting wheel therefor, of a pump carried by said frame, a lever fulcrumed on said frame and connected to said pump and arranged, when oscillated, to operate said pump, an actuating member carried by said wheel and arranged, when said wheel travels along the ground to strike the ground and to be moved thereby in one direction, means for retracting said member, said member, when moved in said direction engaging and swinging said lever in one direction, and means for retracting said lever.

5. In an automatic pumping mechanism, the combination with a vehicle frame and a supporting wheel therefor, of a pump carried by said frame, an actuating member radially reciprocative on said wheel and arranged, when said wheel travels along the ground to strike the ground and to be moved thereby inwardly, means for normally forcing said member outwardly, a lever fulcrumed on said frame and connected to and arranged, when oscillated, to operate said pump and movable by said member in one direction when said member is moved inwardly by striking the ground, and means for retracting said lever.

6. In an automatic pumping mechanism, the combination with a vehicle frame and a supporting wheel therefor, of a pump carried by said frame, an actuating member carried by said wheel and arranged, when said wheel travels along the ground, to strike the ground and to be moved thereby in one direction, a lever fulcrumed on said frame and having a U shaped portion the arms of which are disposed respectively at opposite sides of said wheel, one of said arms being arranged to be in the path of said member, when the latter is moved by the ground, and to be swung in one direction thereby, said lever being connected to said pump and arranged, when oscillated, to operate said pump, and means for retracting said lever.

7. In an automatic pumping mechanism, the combination with a vehicle frame and a supporting wheel therefor, of a pump carried by said frame, an actuating member radially reciprocative on said wheel, means for normally forcing said member to a position in which it, when said wheel is traveling along the ground, will strike the ground and be moved inwardly thereby, a lever having a U shaped portion the arms of which respectively are disposed at opposite sides of said wheel, one of said arms being fulcrumed on said frame and the other arm being in the path of and adapted to be swung by said member in one direction, when said member moves inwardly, said lever, when oscillated, operating said pump, and means for retracting said lever.

8. In an automatic pumping mechanism, the combination with a vehicle frame and a supporting wheel therefor, of a pump cylinder, a piston reciprocative therein, yielding means for pivotally supporting said cylinder on said frame, a lever pivoted to said frame and connected to and arranged to reciprocate said piston when said lever is oscillated, means carried by said wheel adapted, when said wheel travels along the ground to contact with the ground and to be moved thereby and arranged, when so moved, to move said lever in one direction, and means for retracting said lever.

9. In an automatic pumping mechanism, the combination with a vehicle frame and a supporting wheel therefor, a supporting guide on said frame, of a pump cylinder slidable in said guide, yielding means carried by said guide and supporting said cylinder, a piston reciprocative in said cylinder, an actuating member carried by said wheel arranged to strike the ground and to be moved thereby when said wheel travels along the ground, and means actuated by said member when so moved for reciprocating said piston.

10. In an automatic pumping mechanism, the combination with a vehicle having supporting means on which it is adapted for travel, of a pump carried by said vehicle apart from said supporting means, an actuating member carried by said vehicle supporting means arranged, when said vehicle is traveling, to contact with and be moved by the ground relatively to said supporting means, and means actuated by said actuating member for operating said pump.

11. In an automatic pumping mechanism, the combination with a vehicle having a supporting wheel, of a pump carried by said vehicle apart from and not revoluble with said wheel, an actuating member carried by said wheel arranged, when said vehicle is traveling, to contact with and be moved by the ground relatively to said wheel, and means actuated by said actuating member for operating said pump.

In testimony whereof I have signed my name to this specification.

RALPH L. NEWTON.